(12) United States Patent
Atsatt

(10) Patent No.: US 9,355,198 B1
(45) Date of Patent: May 31, 2016

(54) METHOD AND APPARATUS FOR PERFORMING LATE BINDING OF CONTROL STATUS REGISTERS IN A DESIGN COMPILATION FLOW

(71) Applicant: Altera Corporation, San Jose, CA (US)

(72) Inventor: Sean R. Atsatt, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/108,070

(22) Filed: Dec. 16, 2013

(51) Int. Cl.
*G06F 17/50* (2006.01)

(52) U.S. Cl.
CPC ................... *G06F 17/5045* (2013.01)

(58) Field of Classification Search
USPC ........................................................ 716/102
See application file for complete search history.

(56) References Cited

U.S. PATENT DOCUMENTS

| | | | |
|---|---|---|---|
| 6,959,428 B2 * | 10/2005 | Broberg et al. | 716/102 |
| 7,827,517 B1 * | 11/2010 | Orthner | 716/104 |

* cited by examiner

*Primary Examiner* — Eric Lee
(74) *Attorney, Agent, or Firm* — L. Cho

(57) ABSTRACT

A method for designing a system on a target device includes identifying requirements for a control status register (CSR) to be implemented on the system. Register transfer level description for the CSR is generated in response to the requirements identified.

19 Claims, 6 Drawing Sheets

METHOD AND APPARATUS FOR PERFORMING LATE BINDING OF CONTROL STATUS REGISTERS IN A DESIGN COMPILATION FLOW

FIELD

Embodiments of the present invention relate to tools for designing systems on target devices. More specifically, embodiments of the present invention relate to a method and apparatus for performing late binding of control status registers in a design compilation flow.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation and integration, synthesis, placement, and routing of the system on the target device.

The use of pre-designed blocks of logic, known as intellectual property (IP) cores, have increased with current systems. IP cores may be used to implement various components on a target device, such as processors, interfaces, peripheral controllers, and dedicated components used for video and image processing, digital signal processing, and other functions. Some systems utilize dozens to hundreds of IP cores.

IP cores are typically offered as synthesizable register transfer level (RTL) description. RTL is a design abstraction which models a synchronous digital circuit in terms of the flow of digital signals between hardware registers, and the logical operations performed on those signals. RTL abstraction is used in hardware description languages such as Verilog and VHDL to create high-level representations of a circuit, from which lower-level representations and wiring can be derived.

SUMMARY

A method and apparatus for performing late binding of control status registers in a design compilation flow is disclosed. According to an embodiment of the present invention, instead of utilizing off the shelf pre-designed logic (IP cores) delivered with control status registers (CSRs) in register transfer level (RTL) description, the CSRs are delivered in an abstract format. A system designer generates the RTL for CSRs later in the design flow to allow system requirements to be incorporated into the RTL of the pre-designed logic. The system requirements may be obtained directly from a user, simulations, and/or a system constraint file. The system requirements may include register use models, bandwidth and latency requirements, feature specifications, access modes, and other parameters as it affects the pre-designed logic. This allows the user to more easily modify or customize the pre-designed logic to the requirements of the system.

According to a first embodiment of the present invention, a method for designing a system on a target device includes identifying requirements for a CSR to be implemented on the system. The RTL description for the CSR is generated in response to the requirements identified.

According to a second embodiment of the present invention, a method for designing a system on a target device include selecting pre-designed logic for a system from a library. The pre-designed logic is modified in response to requirements for the system. An RTL description is generated for one or more CSRs in the pre-designed logic reflecting the modifying.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
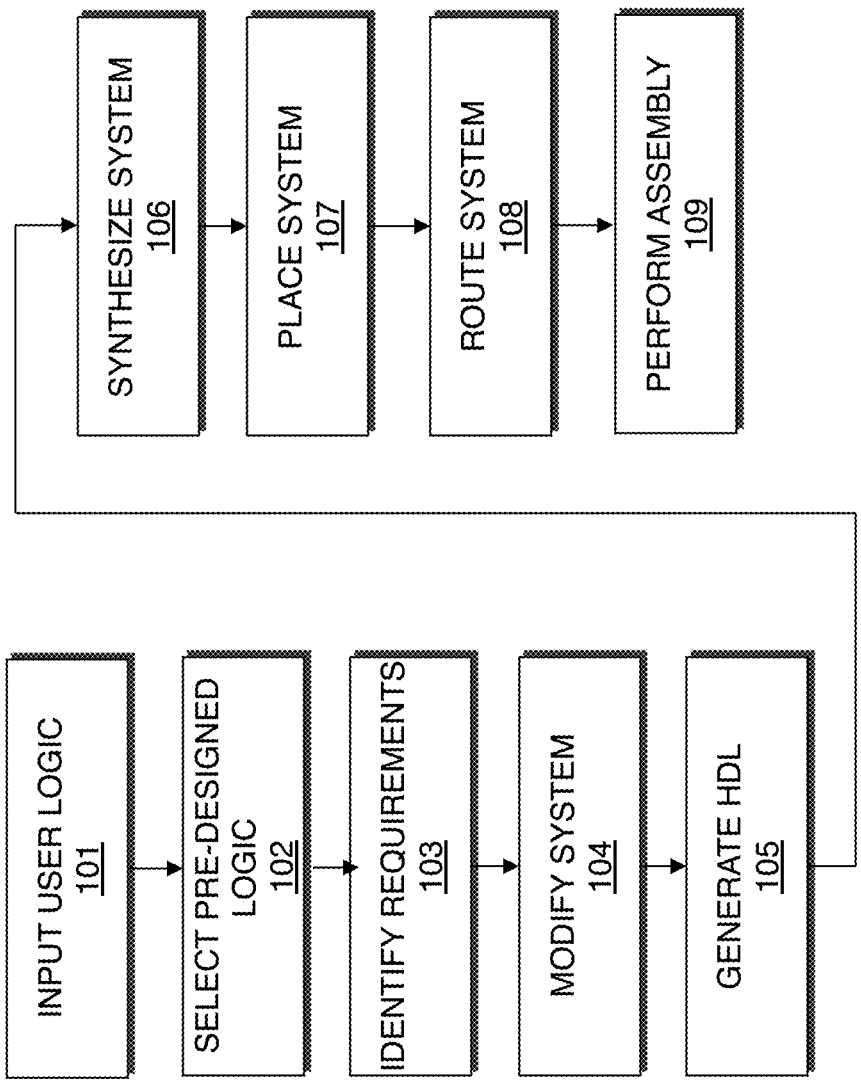
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system.

At 101, a description of a system is input into the EDA tool. The description of the system may be a high level description generated by a user. The description may include components defined by user generated logic ("user logic") in the system. Examples of the components to be implemented by user logic may include processors, memories, receivers/transmitters, input outputs, and the interfaces on these components.

At 102, pre-designed logic is selected from a library of the EDA tool to be used in the system. The pre-designed logic may be used to implement components not being implemented by user logic. Pre-designed logic may be used to implement processors, interfaces, peripheral controllers, and other dedicated components for performing one or more functions. According to an embodiment of the present invention, each of the components may include one or more control status registers (CSRs). CSRs may operate as storage devices for information associated with the operation of its component. For example, CSRs may be accessed to provide status information and control of its component to another. CSRs may also operate to facilitate an interface to the component for software.

According to an embodiment of the present invention, the pre-designed logic selected at 102, provides an abstract description of the CSRs in its design that is in a format other then a register transfer level (RTL) description. For example, the CSRs in a pre-designed logic may be described and defined in an Extensible Markup Language (XML) format, in a register description language (RDL) format, IP-XACT, as text in a spreadsheet or other format. In one embodiment, other components and features in the pre-designed logic may be described in RTL while the CSRs are described in a non-RTL description.

At 103, requirements for the system are identified. The requirements for the system may include requirements for various aspects of the system including the user logic and pre-designed logic. According to an embodiment of the present invention, requirements for the CSRs in the pre-designed logic are identified. The requirements for the CSRs may include the use model and interconnect parameters for the CSRs. The identification of requirements at 103 may be performed by the EDA tool, a user, or a combination of both the EDA tool and a user.

At 104, the system is modified to reflect the requirements identified for the system. According to an embodiment of the present invention, the description and definition for the CSRs in the pre-defined logic are modified to reflect the requirements identified for the system.

At 105, a hardware description language (HDL) design definition is generated to describe the system. The HDL may include the RTL description of the system. According to an embodiment of the present invention where only CSRs from the pre-defined logic are described in a non-RTL description, RTL is generated for the CSRs. According to an embodiment of the present invention where components other than the CSRs are described in a non-RTL description, RTL is also generated for the other components.

At 106, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 107, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device.

At 108, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 109, an assembly procedure is performed. The assembly procedure involves creating a data file that includes information determined by the procedures described at 101-108. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system, which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2:
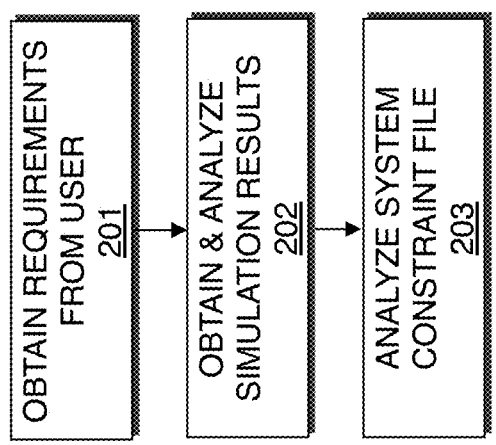
FIG. 2 is a flow chart illustrating a method for obtaining system requirements according to an exemplary embodiment of the present invention.

FIG. 2 is a flow chart illustrating a method for obtaining requirements for a system according to an exemplary embodiment of the present invention. The requirements for the system may include requirements for CSRs on pre-designed logic. The procedure illustrated in FIG. 2 may be used to implement procedure 103 shown in FIG. 1.

At 201, requirements for the system are received from a user. According to an embodiment of the present invention, the requirements may be solicited from the user. A user interface is provided by the EDA tool to allow the user to input specific requirements for the system. The user may be designate requirements globally to the entire system, components in the system, or to specific sub-components in the components.

At 202, requirements for the system are obtained from simulation results. According to an embodiment of the present invention, simulations are performed on the system to generate the simulations results. The simulation results reveal the status of the components during operating conditions of the system. An analysis of the simulation results is performed by the EDA tool to identify requirements for the system without user input.

At 203, a system constraint file is analyzed to identify requirements for the system. The analysis may be performed by the EDA tool without user input. It should be appreciated that the EDA tool may use one or more of the procedures 201-203 to obtain the requirements for the system.

Figure 3:
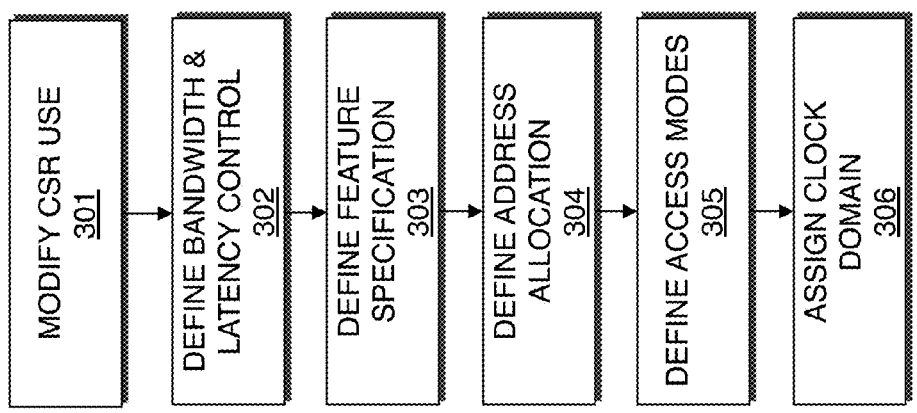
FIG. 3 is a flow chart illustrating a method for modifying the system in response to the system requirements according to an exemplary embodiment of the present invention.

FIG. 3 is a flow chart illustrating a method for modifying a system in response to system requirements according to an exemplary embodiment of the present invention. According to an embodiment of the present invention, the modification may involve further defining properties of the CSRs for the design. The procedure illustrated in FIG. 3 may be used to implement procedure 104 shown at FIG. 1.

At 301, the use of one or more CSRs may be modified in response to the system requirements identified. According to an embodiment of the present invention, unused CSRs identified may be removed from the system. CSRs that are identified to be only read from or written to may be designated as read only or write only registers in order to reduce overhead for supporting the CSRs. CSRs which store values that do not change may be designated as static registers.

At 302, bandwidth and latency control may be defined for CSRs in response to the system requirements. According to an embodiment of the present invention, infrastructure for supporting a high or low data width to CSRs may be defined. Infrastructure for implementing high or low latency protocols may also be defined.

According to an embodiment of the present invention, if high access bandwidth is required, the system would be modified so that the RTL generated would support a higher data width, no wait or lower wait (not ready) requesting between subsequent reads, and a data transfer protocol that supports pipelined or split reads. Exemplary data protocols may include Advanced Microcontroller Bus Architecture (AMBA) AXI3 or AMBA Advanced Peripheral Bus (APB).

At 303, features of the CSRs may be defined in response to the system requirement. According to an embodiment of the present invention, interfaces may be defined for CSRs to support required security, exclusive access, data bursting, and other protocols.

According to an embodiment of the present invention, if security control over access on a per transaction basis is required, the system would be modified so that the RTL generated would support a data transfer protocol that supports security signaling on transactions. If security control on a modal basis is required then the system would be modified so that the RTL generated would support a modal control signal on an interface. In both cases, secure registers would also be grouped together to allow for efficient implementations.

At 304, addresses for the CSRs may be defined in response to the system requirements.

At 305, access modes for the CSRs may be defined in response to the system requirements. According to an embodiment of the present invention, infrastructure for supporting back door memory map, processor read write, shift access, and/or signal level access may be defined for one or more CSRs.

At 306, clock domains may be assigned to CSRs in response to the system requirements.

The modifications described with reference to FIG. 3 pertain to modifications made to CSRs. It should be appreciated, however, that modifications to other components may also be made to further improve the operation of the system.

FIGS. 1 through 3 are flow charts that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques.

Systems implemented on target devices may contain thousands of CSRs. The area cost of implementing and interconnecting numbers of registers of this magnitude is high. Furthermore, achieving timing closure for numbers of registers of this magnitude may be challenging even for sophisticated EDA tools. When utilizing off the shelf, pre-designed logic (IP cores), EDA tools incorporate pre-designed logic with assumed access patterns. The assumed access patterns often make assumptions regarding bandwidth, latency, data widths, protocols used, and modes needed for the system, which affect the CSRs. Due to inaccurate assumptions of the access patterns, many of the pre-designed logic are either over-designed with too much logic which makes the area cost higher and achieving timing closure more challenging. At the other extreme, other pre-designed logic are under-designed with insufficient logic which creates more challenges for the user to make the system operable.

Embodiments of the present invention, as described in FIGS. 1 through 3, delay generation of RTL until the use model for the system is identified. This reduces the number of assumptions made to access patterns and results in a more optimal design for the system. The EDA tool (system designer) generates the RTL for CSRs later in the design flow to allow system requirements to be incorporated into the RTL of the pre-designed logic. The system requirements may be obtained directly from a user, simulations, and/or a system constraint file. The system requirements may include register use models, bandwidth and latency requirements, feature specifications, access modes, and other parameters as it affects the pre-designed logic. This would allow the user to more easily modify or customize the pre-designed logic to the requirements of the system. According to an embodiment of the present invention, a CSR's RTL may be optimized for its use model. The interface for a CSR may be optimized for its use model and interconnect. A CSR's interconnect may be optimized for its interconnect requirements.

Figure 4:
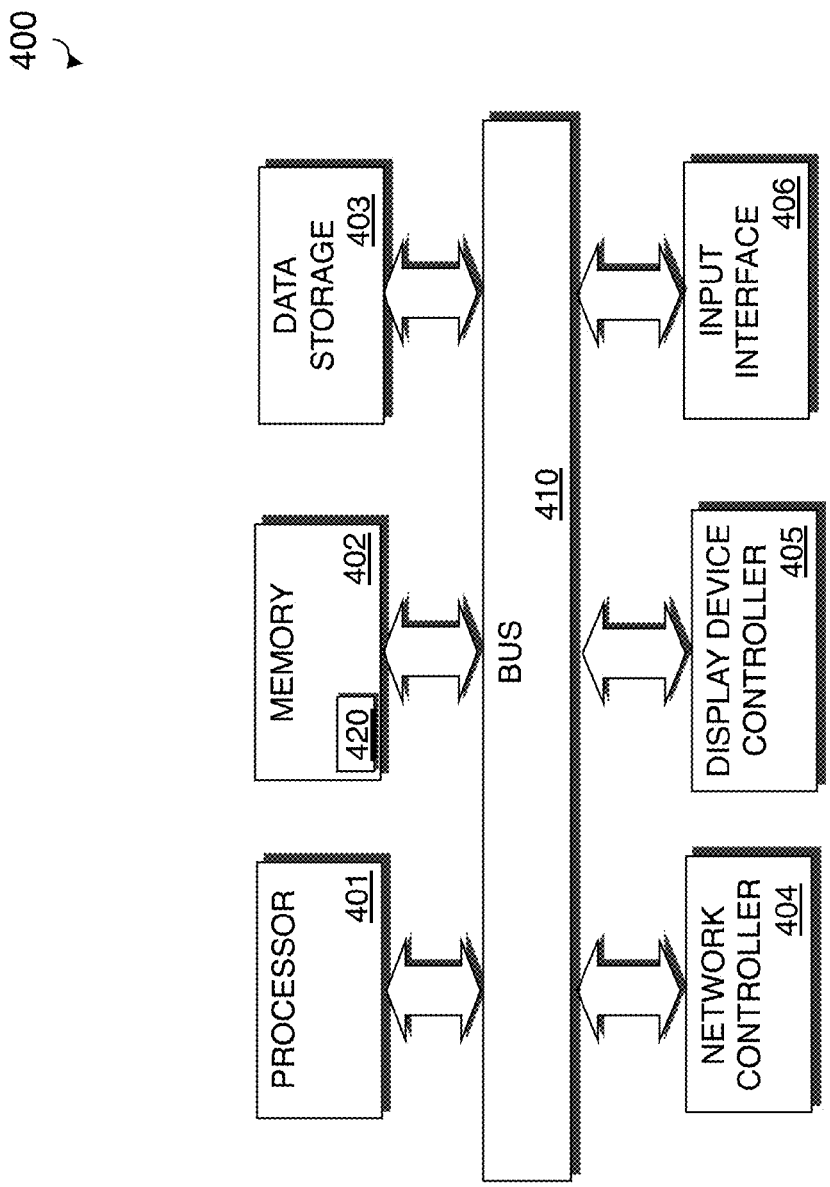
FIG. 4 illustrates a block diagram of a computer system implementing a system designer according to an embodiment of the present invention.

FIG. 4 is a block diagram of an exemplary computer system 400 in which an example embodiment of the present invention resides. The computer system 400 may be used to implement a system designer such as an EDA tool. The computer system 400 includes a processor 401 that processes data signals. The processor 401 is coupled to a bus 410 that transmits data signals between components in the computer system 400. The bus 410 may be a single bus or a combination of multiple buses. The computer system 400 includes a memory 402. The memory 402 may be a dynamic random access memory device, a static random access memory device, and/or other memory device. The memory 402 may store instructions and code represented by data signals that may be executed by the processor 401. A data storage device 403 is coupled to the bus 410. The data storage device 403 may be a hard disk drive, a floppy disk drive, a CD-ROM device, a flash memory device or other mass storage device.

A network controller 404 is coupled to the bus 410. The network controller 404 may link the computer system 400 to a network of computers (not shown) and supports communication among the machines. A display device controller 405 is coupled to the bus 410. The display device controller 405 allows coupling of a display device (not shown) to the computer system 40 and acts as an interface between the display device and the computer system 400. An input interface 406 is coupled to the bus 410. The input interface 406 may be, for example, a keyboard and/or mouse controller or other input interface. The input interface 406 allows coupling of an input device to the computer system 400 and transmits data signals from an input device to the computer system 400. It should be appreciated that computer systems having a different architecture or having different components may also be used to implement the computer system 400.

According to an embodiment of the present invention, a system designer 420 may reside in memory 402 and be executed by the processor 401. The system designer 420 may be an EDA tool such as Quartus by Altera® Corporation. The system designer 420 may operate to select pre-designed logic for a system from a library. The pre-designed logic may be modified in response to requirements for the system. The requirements for the system may be identified by a user, analysis of simulation results, or analysis of a system constraints file. RTL description may be generated for one or more CSRs in the pre-designed logic reflecting the modifications performed. The system designer 420 may also operate to synthesize, map, place and route the system onto a target device. According to an embodiment of the present invention, if an analysis of simulation runs of a system indicate that a fraction of available interface bandwidth is utilized by a design for the system, the system designer 420 may automatically change the CSR interface data width.

Figure 5:
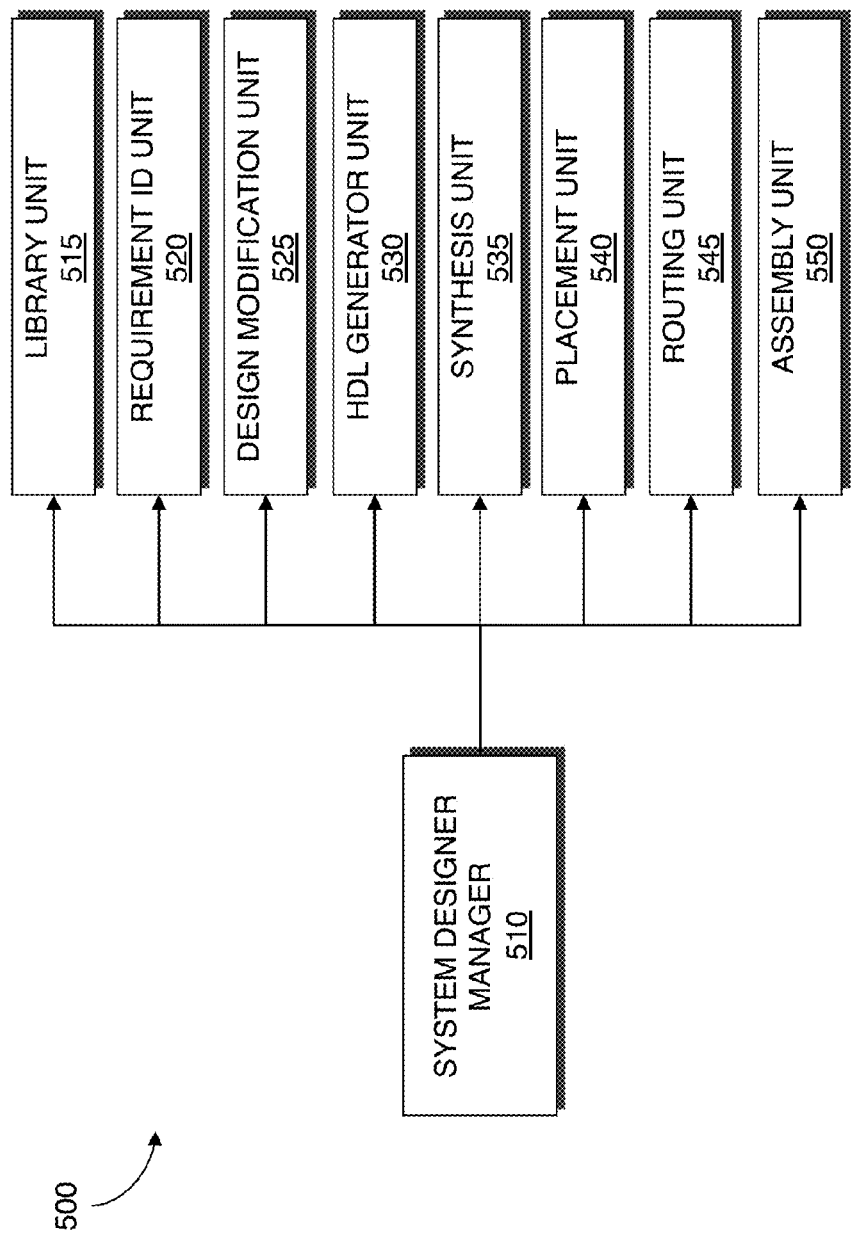
FIG. 5 illustrates a block diagram of a system designer according to an embodiment of the present invention.

FIG. 5 illustrates a system designer 500 according to an embodiment of the present invention. The system designer 500 may be an EDA tool for designing a system on a target device such as an FPGA, structured application-specific integrated circuit (ASIC), ASIC, or other circuitry. FIG. 5 illustrates modules implementing an embodiment of the system designer 500. According to one embodiment, the modules represent software modules and system design may be performed by a computer system such as the one illustrated in FIG. 4 executing sequences of instructions represented by the modules shown in FIG. 5. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 500 includes a system designer manager 510. The designer system manager 510 is connected to and transmits data between the other components of the system designer 500. The system designer manager 510 provides a user interface that allows a user to input data into the system designer 500. According to an embodiment of the present invention, a description of a system may be input into the system designer by the user. The description of the system may be a high level description generated by a user. The description may include components defined by user generated logic ("user logic") in the system.

The system designer 500 includes a library unit 515. The library unit 515 includes a plurality of pre-designed logic that may be selected by a user to implemented into the system. The pre-designed logic in the library unit 515 may be used to implement components not being implemented by user logic. According to an embodiment of the present invention, the pre-designed logic provides an abstract description of CSRs in its design that is in a format other then a RTL description. For example, the CSRs in a pre-designed logic may be described and defined in an Extensible Markup Language (XML) format, in a register description language (RDL) format, a spreadsheet or other format. In one embodiment, other components and features in the pre-designed logic may be described in RTL while the CSRs are described in a non-RTL description.

The system designer 500 includes a requirement identification (ID) unit 520. The requirement identification unit 520 identifies the requirements for the system. The requirements for the system may include requirements for various aspects of the system including the user logic and pre-designed logic. According to an embodiment of the present invention, requirements for the CSRs in the pre-designed, such as the use model and interconnect parameters for the CSRs, are identified. The requirements identification unit 520 may identify the requirements by obtaining the requirements from the user, by obtaining and analyzing simulation results for the system, and/or analyzing a system constraint file. Therefore, it should be appreciated that the identification may be performed by the system designer 500, a user, or a combination of both the system designer 500 and a user.

The system designer 500 includes a design modification unit 525. The design modification unit 525 modifies the system to reflect the requirements identified for the system. According to an embodiment of the present invention, the description and definition for the CSRs in the pre-defined logic are modified to reflect the requirements identified for the system.

The system designer 500 includes a HDL generator unit 530. The HDL generator unit 530 generates HDL for the design of the system. The HDL describes the operation of the system to be programmed on the target device. The HDL description provides high-level representations of a circuit in terms of the flow of signals (or transfer of data) between hardware registers, and the logic operations performed on those signals. According to an embodiment of the present invention, when only CSRs from the pre-defined logic are described in a non-RTL description, RTL is generated for the CSRs. According to an embodiment of the present invention, when components other than the CSRs are described in a non-RTL description, RTL is also generated for the other components.

The system designer 500 includes a synthesis unit 535 that performs synthesis. The synthesis unit 540 generates a logic design of a system to be implemented on the target device. According to an embodiment of the system designer 500, the synthesis unit 540 takes a conceptual HDL design definition and generates an optimized logical representation of the system. The optimized logical representation of the system generated by the synthesis unit 540 may include a representation that has a reduced number of functional blocks and registers, such as logic gates and logic elements, required for the system. Alternatively, the optimized logical representation of the system generated by the synthesis unit 535 may include a representation that has a reduced depth of logic and that generates a lower signal propagation delay.

The synthesis unit 535 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 500 includes a placement unit 540 that processes the optimized technology-mapped netlist to produce a placement for each of the functional blocks. The placement identifies which components or areas on the target device are to be used for specific functional blocks and registers.

The system designer 500 includes a routing unit 545 that performs routing. The routing unit 545 determines the routing resources on the target device to use to provide interconnection between the components implementing functional blocks and registers of the logic design.

The system designer 500 includes an assembly unit 550 that performs an assembly procedure that creates a data file that includes the design of the system generated by the system designer 500. The data file may be a bit stream that may be used to program the target device. The assembly unit 550 may output the data file so that the data file may be stored or alternatively transmitted to a separate machine used to program the target device. It should be appreciated that the assembly unit 550 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 6:
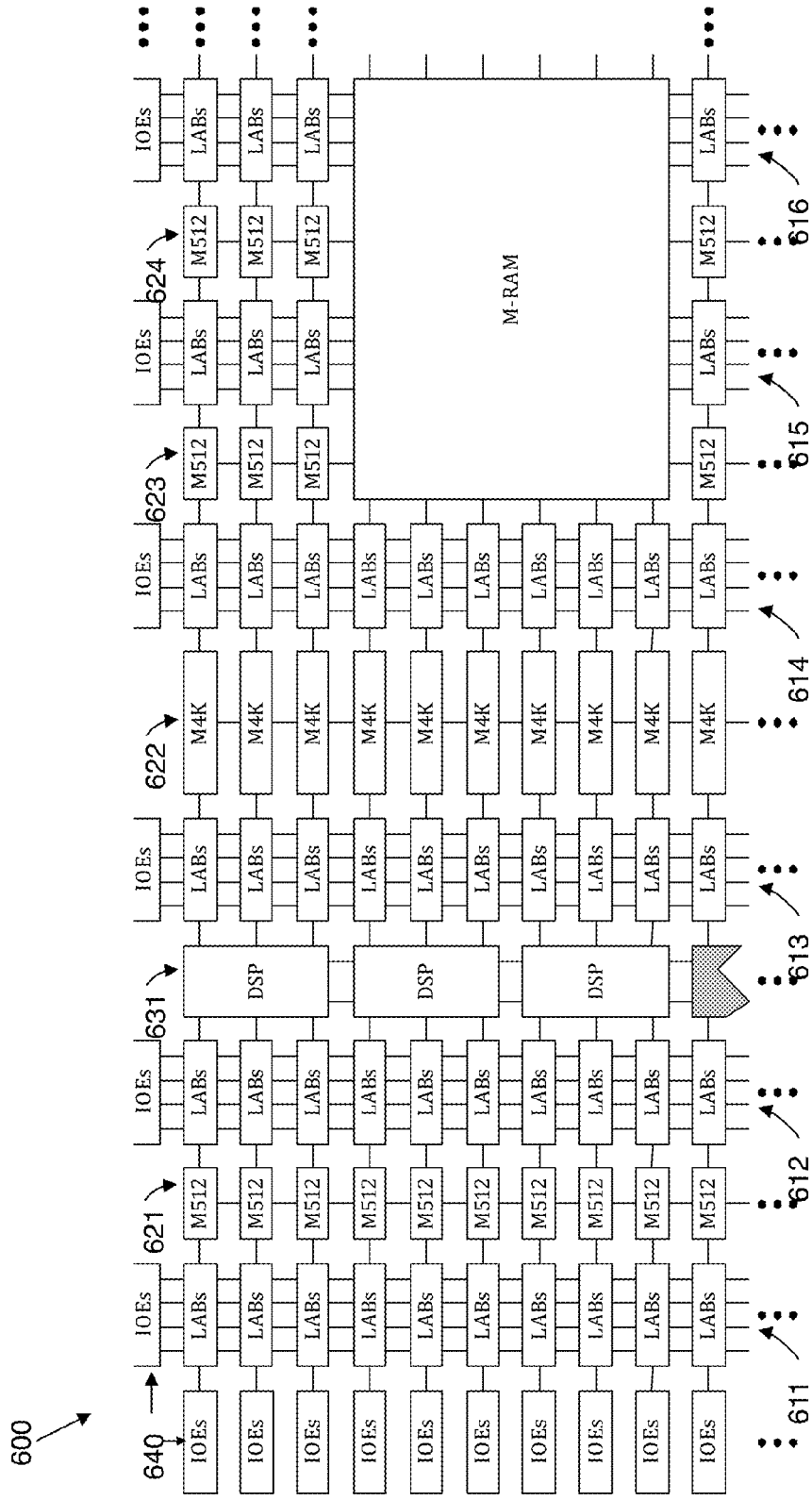
FIG. 6 illustrates an exemplary target device according to an embodiment of the present invention.

FIG. 6 illustrates a device 600 that may be used to implement a target device according to an embodiment of the present invention. The device 600 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 600. Columns of LABs are shown as 611-616. It should be appreciated that the logic block may include additional or alternate components.

The device 600 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 600. Columns of memory blocks are shown as 621-624.

The device 600 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 600 and are shown as 631.

The device 600 includes a plurality of input/output elements (IOEs) 640. Each IOE feeds an IO pin (not shown) on the device 600. The IOEs 640 are located at the end of LAB rows and columns around the periphery of the device 600. Each IOE may include a bidirectional IO buffer and a plurality of registers for registering input, output, and output-enable signals.

The device 600 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. For example, embodiments of the present invention describe a method for performing late binding for CSRs. It should be appreciated that the embodiments disclosed may also be used to perform late binding for other components. The specification and drawings are, accordingly, to be regarded in an illustrative rather than restrictive sense.

What is claimed is:

1. A method for designing a system on a target device:
performing simulations on the system and a control status register (CSR) implemented on the system, wherein the system and the CSR are described in a format other than register transfer level (RTL);
identifying requirements for the CSR by analyzing simulation results for the system; and
generating RTL description for the CSR, to be implemented with programmable resources on the target device, with a hardware description language generator unit in response to the requirements identified.

2. The method of claim 1, wherein identifying the requirements for the CSR is further achieved by receiving the requirements from a user.

3. The method of claim 1, wherein identifying the requirements for the CSR is further achieved by analyzing a system constraint file.

4. The method of claim 1, wherein the requirements for the CSR are associated with how the register is used in the system.

5. The method of claim 1, wherein the requirements for the CSR are associated with bandwidth and latency control for the CSR.

6. The method of claim 1, wherein the requirements for the CSR are associated with access modes of the CSR.

7. The method of claim 1, wherein the requirements for the CSR are associated with protocol requirements for the CSR.

8. The method of claim 1, wherein the control status register stores information associated with a component it resides in and operates as an interface for software.

9. The method of claim 1, wherein the RTL description of the control status register models the control status register in terms of a flow of digital signals between hardware register, and logical operations performed on the digital signals.

10. A non-transitory computer readable medium including a sequence of instructions stored thereon for causing a computer to execute a method comprising:
selecting pre-designed logic for a system from a library;
performing simulations on the system, wherein the system is described in a format other than register transfer level (RTL);
identifying requirements for the system by analyzing simulation results for the system;
modifying the pre-designed logic in response to the requirements for the system; and generating RTL description for one or more control status registers (CSRs) in the pre-designed logic reflecting the modifying to be implemented with programmable resources on a target device.

11. The non-transitory computer readable medium of claim 10, wherein the pre-designed logic for the system from the library has CSRs described in a format other than RTL.

12. The non-transitory computer readable medium of claim 10, wherein modifying the pre-designed logic comprises specifying an interface for the one or more CSRs.

13. The non-transitory computer readable medium of claim 10, wherein modifying the pre-designed logic comprises specifying a protocol for interconnect associated with the one or more CSRs.

14. The non-transitory computer readable medium of claim 10, wherein modifying the pre-designed logic comprises specifying an access mode for the one or more CSRs.

15. The non-transitory computer readable medium of claim 10, wherein identifying the requirements for the system is further achieved by receiving the requirements from a user.

16. The non-transitory computer readable medium of claim 10, wherein identifying the requirements for the system is further achieved by analyzing a system constraint file.

17. A system designer unit, comprising:

a simulation unit that performs simulations on a system and a control status register (CSR) implemented on the system, wherein the system and the CSR are described in a format other than register transfer level (RTL);

a requirement identification unit that identifies requirements for the CSR by analyzing simulation results for the system; and a hardware description language generator unit that generates a RTL description for the CSR in response to the requirements identified to be implemented with programmable resources on a target device.

18. The system designer unit of claim 17, wherein the requirement identification unit further identifies the requirements by receiving the requirements from a user.

19. The system designer unit of claim 17, wherein the requirement identification unit further identifies the requirements by analyzing a system constraint file associated with the system.

* * * * *